2,880,229
Patented Mar. 31, 1959

2,880,229

CINNAMOYL-SUBSTITUTED OCTAHYDROPHENANTHRENE DERIVATIVES

Willard M. Hoehn, Wilmette, Ill., assignor to G. D. Searle & Co., Chicago, Ill., a corporation of Delaware No Drawing. Application May 8, 1957
Serial No. 657,717

8 Claims. (Cl. 260—468.5)

The present invention is concerned with cinnamoyl and alkoxycinnamoyl substitution products of certain octahydrophenanthrene derivatives. More particularly, this invention is concerned with compounds which can be represented by the general structural formula

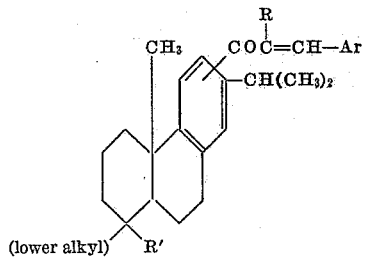

In this formula, R can represent hydrogen or a lower alkyl radical, and Ar can represent an aromatic radical. In preferred embodiments of this invention, the aromatic radical can be a phenyl radical, or an alkoxyphenyl radical of the type —C$_6$H$_4$—O-lower alkyl The term "lower alkyl" as used here and elsewhere in this application is defined as a straight- or branched-chain alkyl radical containing fewer than nine carbon atoms. Included within the scope of the term Ar are, therefore, such alkoxyphenyl radicals as o-methoxyphenyl, m-methoxyphenyl, p-methoxyphenyl, o-ethoxyphenyl, m-ethoxyphenyl, p-ethoxyphenyl, and homologs of the foregoing. The term R' in the foregoing structural formula can represent hydrogen, the methyl radical, the carboxyl radical, or a (lower)alkoxycarbonyl radical of the type —COO-(lower)alkyl The entire group

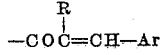

is a cinnamoyl or substituted-cinnamoyl radical, and is preferably attached to one of the positions 6 and 8 of the octahydrophenanthrene ring.

Starting materials suitable for the manufacture of certain of the compounds of this invention include dehydroabietane and isomers and homologs thereof. One compound of this class is 1-ethyl-4a-methyl-7-isopropyl-1,2,3,4,4a,9,10,10a-octahydrophenanthrene, which can be prepared by destructively distilling a mixture of dehydroabietinol and boric acid, followed by hydrogenating the distillate. One of the methods for the preparation of starting materials having lower alkyl groups larger than ethyl in the 1 position consists in the treatment of the acid chloride of dehydroabietic acid with a lower dialkyl cadmium and reduction of the resulting ketone by the Wolff-Kishner procedure to the 1,4a-dimethyl-1-lower alkyl-7-isopropyl-1,2,3,4,4a,9,10,10a-octahydrophenanthrene.

Still another class of starting materials useful in the manufacture of compounds of this invention is the class consisting of the lower alkyl esters of dehydroabietic acid.

Each of the starting materials comprehended herein undergoes aluminum chloride-catalyzed condensation reactions with alkanoyl halides, typically alkanoyl chlorides of the type (lower)alkyl-COCl The reaction is suitably carried out in an organic solvent such as nitrobenzene or chlorobenzene, and proceeds in each case with the formation of the corresponding 6-alkanoyl and 8-alkanoyl derivatives. In the normal case the 6-alkanoyl derivative is formed in larger amount. The isomers can be separated by such means as fractional crystallization, fractional distillation, chromatographic fractionation, or combinations of these means.

Each of the alkanoyl derivatives thus formed undergoes condensation reactions with aromatic aldehydes, representatively with benzaldehyde and alkoxy-substituted benzaldehydes, in the presence of a basic reaction medium such as an alkali metal hydroxide in a lower alkanol, or an alkali metal alkoxide in a lower alknol. Condensation and spontaneous dehydration occur, with the formation of the unsaturated ketones of this invention. In representative cases, the desired reaction product is isolated by dilution of the reaction mixture with water, acidification with dilute hydrochloric acid, removal of the organic solvent and unreacted aldehyde by distillation with steam, and crystallization of the water-insoluble product which remains.

In the synthesis of those compounds of this invention in which the term R' represents a carboxyl group, the preferred procedure is to condense 6-acetyldehydroabietic acid or 8-acetyldehydroabietic acid with the selected aromatic aldehyde in a basic reaction medium. The desired product can be isolated by dilution with water and acidification with dilute hydrochloric acid.

The compositions of this invention have useful pharmacological properties, and in particular are androgenic and anabolic agents. They also exhibit antihypertensive properties. An additional purpose for which these compounds are valuable is as shields against ultraviolet radiation. Unlike the starting materials from which they are derived, these cinnamoyl and substituted cinnamoyl derivatives are highly effective in absorbing radiation in the wavelength range of about 290–340 millimicrons. Within this range, the cinnamoyl derivatives are relatively more effective in shielding against radiation of shorter wavelengths, whereas the p-methoxycinnamoyl derivatives are relatively more effective in shielding against radiation of longer wavelengths. For employment as ultraviolet shields, these compounds can be dispersed in a medium such as corn oil, or incorporated into a film.

This invention will appear more fully from the examples which follow. These examples are set forth by way of illustration only, and it will be understood that the invention is not to be construed as limited in spirit or in scope by the details contained therein, as many modifications in materials and methods will be apparent from this disclosure to those skilled in the art. In these examples, temperatures are given in degrees centigrade (° C.), distillation pressures in millimeters (mm.) of mercury, and quantities of materials in parts by weight.

Example 1

To a stirred solution of 16.2 parts of dehydroabietane in 120 parts of nitrobenzene, maintained at about 0–5° C., there is added 4.7 parts of acetyl chloride and then over a period of about two hours, 16.5 parts of aluminum chloride. The reaction mixture is maintained under anhydrous conditions at about 5° C. for 48 hours, after which it is poured onto 500 parts of ice. After the addition of 65 parts of 10% hydrochloric acid, and thorough mixing, the nitrobenzene solution is separated and diluted with 450 parts of ether. This solution is washed with water, with 2% sodium hydroxide solution, and again with water; it is then dried over anhydrous sodium sulfate, filtered and brought to dryness by vaporization of solvents. The residue is fractionated by distillation at a pressure of about 0.05 mm. The desired product is obtained as a distillate boiling at about 162° C. Further purification by crystallization of the distillate from dilute acetone affords 1,1,4a-trimethyl-6-acetyl-7-isopropyl-1,2,3,4,4a,9,10, 10a-octahydrophenanthrene melting at about 98–99° C. The specific rotation of this compound in 1% chloroform solution is about +59.5°. Infrared absorption maxima appear at about 5.99, 6.25, 7.39, 7.92, and 8.20 microns. This compound has the structural formula

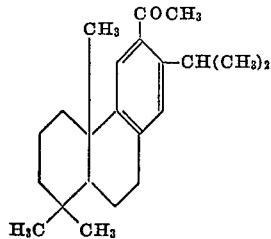

The aqueous acetone crystallization liquors which remain when no further crystalline crops can be obtained are combined and concentrated to an oily residue by distillation under reduced pressure. This oily residue is fractionated by distillation at about 0.03 mm. The major portion of the material is collected as a distillate boiling at about 135–136° C., and is 1,1,4a-trimethyl-7-isopropyl-8 - acetyl - 1,2,3,4,4a,9,10,10a - octahydrophenanthrene. This compound exhibits infrared absorption maxima at about 5.97, 6.22, 7.38, 7.92, 8.18, and 12.08 microns. The specific rotation of a 1% solution in chloroform is about +8.2. The structural formula is

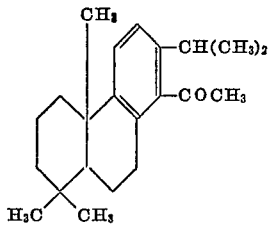

*Example 2*

To a solution of 1.6 parts of 1,1,4a-trimethyl-6-acetyl-7 - isopropyl - 1,2,3,4,4a-9,10,10a - octahydrophenanthrene in a methanolic solution of sodium methoxide (prepared by dissolving 0.25 part of sodium in 24 parts of methanol) is added 2 parts of p-methoxybenzaldehyde. Over a period of about 30 minutes, the mixture is concentrated by distillation to about one-half of its original volume. It is then acidified with dilute hydrochloric acid and subjected to distillation with steam until the excess p-methoxybenzaldehyde is removed. The insoluble, gummy product is collected and purified by crystallizations from mixtures of ether and methanol. In this manner there is obtained 1,1,4a-trimethyl-6-(p-methoxycinnamoyl) - 7 - isopropyl - 1,2,3,4,4a,9,10,10a - octahydrophenanthrene melting at about 112–113° C. The ultraviolet absorption spectrum shows a maximum at 330 millimicrons with a molecular extinction coefficient of about 28,200. The specific rotation of a 0.5% solution in chloroform is about +55°. The structural formula is

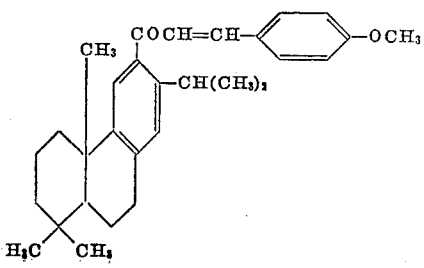

When the foregoing procedure is carried out with the substitution of 2 parts of o-ethoxybenzaldehyde for the p-methoxybenzaldehyde, the compound obtained is 1,1,4a - trimethyl - 6 - (o - ethoxycinnamoyl) - 7 - isopropyl-1,2,3,4,4a,9,10,10a-octahydrophenanthrene.

*Example 3*

A solution of 4.5 parts of 1,1,4a-trimethyl-6-acetyl-7-isopropyl - 1,2,3,4,4a,9,10,10a - octahydrophenanthrene in a methanolic solution of sodium methoxide containing 1.2 parts of sodium methoxide in 40 parts of methanol is treated with 3 parts of benzaldehyde and heated under reflux for 20 minutes. After acidification, the methanol and excess benzaldehyde are removed by distillation with steam, and the aqueous phase and gummy product which remain are extracted with ether. The ethereal extract is washed with water, with several portions of 4% sodium hydroxide solution, and finally with several portions of water. The ethereal solution is rendered anhydrous, filtered, and brought to dryness by vaporization of the ether. A solution of the gummy residue in a minimum quantity of ether is diluted with methanol. The crystalline product which separates upon standing is collected and recrystallized from methanol or aqueous methanol. The compound obtained is 1,1,4a-trimethyl-6-cinnamoyl-7 - isopropyl - 1,2,3,4,4a,9,10,10a - octahydrophenanthrene melting at about 88–89° C. The specific rotation is about +61° in 1% chloroform solution. Infrared absorption maxima are observed at about 6.02, 6.14, 6.25, 7.26, and 7.82 microns. The structural formula is

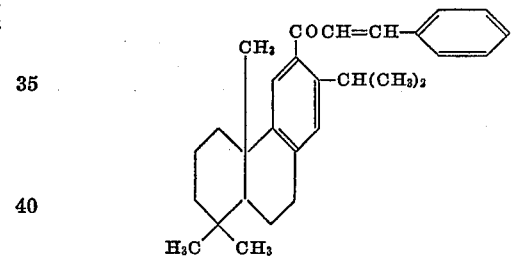

By substitution of 4.5 parts of 1,1,4a-trimethyl-7-isopropyl-8-acetyl - 1,2,3,4,4a,9,10,10a - octahydrophenanthrene for the 1,1,4a-trimethyl-6-acetyl-7-isopropyl-1,2,3,4,4a,9, 10,10a-octahydrophenanthrene in the procedure of this example, the compound obtained is 1,1,4a-trimethyl-7-isopropyl - 8 - cinnamoyl - 1,2,3,4,4a,9,10,10a - octahydro-phenanthrene.

*Example 4*

To a solution of 3 parts of 1,1,4a-trimethyl-7-isopropyl-8-acetyl - 1,2,3,4,4a,9,10,10a-octahydrophenanthrene and 2.2 parts of p-methoxybenzaldehyde in 16 parts of methanol is added a methanolic solution of sodium methoxide prepared by dissolving 0.5 part of sodium in 16 parts of methanol. The reaction mixture is heated under reflux for 20 minutes. It is then rendered slightly acidic with dilute hydrochloric acid, and the methanol and most of the unreacted p-methoxybenzaldehyde are removed by distillation with steam. The water-insoluble, gummy product which remains is separated and dissolved in ether. The ethereal solution is washed with water, with 2% sodium hydroxide solution, and finally with several portions of water, after which it is rendered anhydrous and concentrated to dryness by vaporization of the solvent. The gummy residue which remains is fractionated by distillation in a short-path apparatus at a pressure of about 0.02 mm. The desired product is obtained at a distillation temperature of about 220–225° C. (bath temperature about 260° C.). It is 1,1,4a-trimethyl-7-isopropyl-8-(p-methoxycinnamoyl) - 1,2,3,4,4a,9,10,10a - octahydrophenanthrene. The ultra-violet absorption spectrum of this compound shows an inflection at 230 millimicrons and a maximum at 329 millimicrons, with respective molecular extinction coefficients of about 12,920 and 26,700. The structural formula is

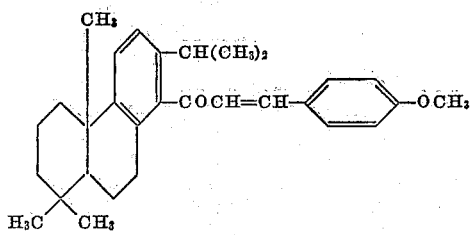

By the foregoing procedure, with the substitution of 2.4 parts of m-ethoxybenzaldehyde for the p-methoxybenzaldehyde, the product obtained is 1,1,4a-trimethyl-7-isopropyl-8-(m-ethoxycinnamoyl) - 1-2,3,4,4a,9,10,10a - octahydrophenanthrene.

Example 5

To a solution of 10.7 parts of methyl 6-acetyl-dehydroabietate and 5.3 parts of benzaldehyde in 40 parts of methanol is added a methanolic solution of sodium methoxide prepared by adding 1.25 parts of sodium to 40 parts of methanol. The reaction mixture is heated under reflux for ten minutes, after which methanol is removed by distillation until insoluble material begins to separate from the mixture. A steam distillation is then carried out until the methanol and unreacted benzaledhyde are removed. An ethereal solution of the gummy product is rendered anhydrous over sodium sulfate, filtered and evaporated to dryness. The residue is purified by crystallization from methanol to afford 1,4a-dimethyl-1-methoxycarbonyl-6 - cinnamoyl - 7 - isopropyl - 1,2,3,4,4a,9,10,10a-octahydrophenanthrene which melts at about 109–110° C. and has a specific rotation of about +74° in chloroform solution. The structural formula is

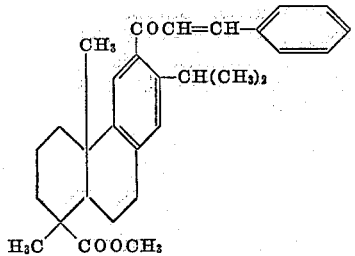

By the foregoing procedure, with the substitution of 6 parts of p-methoxybenzaldehyde for the benzaldehyde, there is obtained 1,4a-dimethyl-1-methoxycarbonyl-6-(p-methoxycinnamoyl)-7-isopropyl-1,2,3,4,4a,9,10,10a - octahydrophenanthrene. This compound has an ultraviolet absorption maximum at about 330 millimicrons.

Example 6

To a solution of 3.4 parts of 6-acetyldehydroabietic acid and 1.5 parts of o-methoxybenzaldehyde in 20 parts of methanol is added 1.5 parts of sodium methoxide. The reaction mixture is heated under reflux for 15 minutes. It is then chilled, diluted with 50 parts of water and rendered slightly acidic with dilute hydrochloric acid. The precipitated product is dissolved by extraction with ether. The ethereal solution is washed with several small portions of water, rendered anhydrous, and concentrated to dryness by vaporization of the solvent. Remaining traces of o-methoxybenzaldehyde are removed by drying the residue at about 90° C. under high vacuum. The residual product thus obtained is 1,4a-dimethyl-6-(o-methoxycinnamoyl)-7-isopropyl - 1,2,3,4,4a,9,10,10a - octahydrophenanthrene-1-carboxylic acid which exhibits an ultraviolet absorption maximum at about 328 millimicrons, and has the structural formula

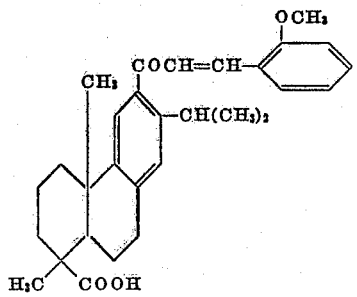

Example 7

To a solution of 3.85 parts of methyl 6-butyryaldehydroabietate and 2.1 parts of benzaldehyde in 20 parts of methanol is added 2.5 parts of sodium methoxide. The reaction mixture is heated under reflux for ten minutes and then, after cooling to room temperature, is diluted with 150 parts of water. The clear, aqueous phase is removed by decantation and discarded. The remaining, gummy product is subjected to distillation with steam until the excess benzaldehyde is removed. The gummy product is then dissolved in ether, and the ethereal solution is washed with water, dried, and concentrated by vaporization of the solvent. The residue is fractionated by distillation at a pressure of about 0.02 mm. A viscous distillate of the desired compound is collected at a distillation temperature of about 200-205° C. (bath temperature about 255–260° C.). This compound is 1,4a-dimethyl-1-methoxycarbonyl-6 - (α - ethylcinnamoyl)-7-isopropyl-1,2,3,4,4a,9,10,10a-octahydrophenanthrene of the structural formula

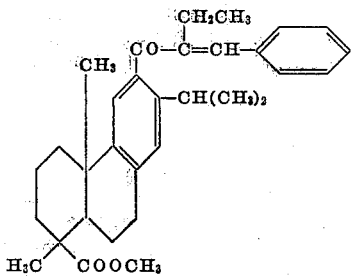

Example 8

A solution prepared from 26 parts of ethyl dehydroabietate, 90 parts of nitrobenzene and 7.4 parts of propionyl chloride is cooled to about 0–5° C. Aluminum chloride (21 parts) is added in several portions, with stirring. The reaction mixture is then maintained at about 5° C. for 40 hours, after which it is poured onto ice. When the aqueous layer is tested with indicator paper the pH is less than 2. About 100 parts of ether is added; after thorough mixing the separated organic phase is washed with dilute sodium hydroxide solution and with several portions of water. It is then dried over anhydrous sodium sulfate and concentrated under vacuum until the ether and nitrobenzene have been removed. The residue is subjected to a distillation at about 0.02 mm. to afford crude ethyl 6-propionyldehydroabietate, suitable for use in the following operation without further purification.

To a solution of 5 parts of ethyl 6-propionyldehydroabietate and 3 parts of p-ethoxybenzaldehyde in 32 parts of hot methanol is added a methanolic solution of sodium methoxide prepared by dissolving 0.75 part of sodium in 24 parts of methanol. The reaction mixture is heated under reflux for 15 minutes, after which it is acidified with dilute hydrochloric acid and subjected to distillation with steam until the methanol and unreacted p-ethoxybenzaldehyde are removed. The gummy product is dissolved by extraction with ether. When the ethereal solution is rendered anhydrous over sodium sulfate, filtered and evaporated to dryness, it deposits a residue of crude 1,4a-dimethyl 1-ethoxycarbonyl-6-(α-methyl-p-ethoxycinnomoyl)-7 - isopropyl-1,2,3,4,4a,9,10,10a-octahydrophenanthrene, which can be further purified by crystallization from methanol. This compound exhibits an ultraviolet absorption maximum at about 325 millimicrons, and has the structural formula

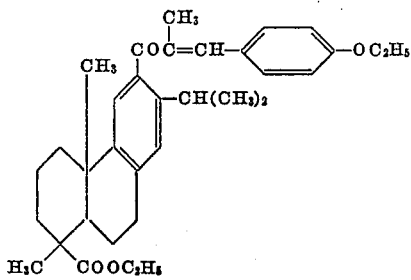

Example 9

A solution is prepared from 6 parts of methyl 8-acetyldehydroabietate and 3.2 parts of benzaldehyde in 32 parts of methanol. There is added a methanolic solution of sodium methoxide obtained by dissolving 0.75 part of sodium in 24 parts of methanol, and the reaction mixture is heated under reflux for 20 minutes. The mixture is made slightly acidic with dilute hydrochloric acid. Methanol and unreacted benzaldehyde are then removed by distillation with steam, and the water-insoluble, gummy product which remains is dissolved in ether. The ethereal solution is washed with several portions of water, rendered anhydrous over sodium sulfate, filtered and evaporated to dryness. The non-volatile residue which results is crude 1,4a-dimethyl-1-methoxycarbonyl-7-isopropyl-8-cinnamoyl - 1,2,3,4,4a,9,10,10a - octahydrophenanthrene which has an ultraviolet absorption maximum at about 298 millimicrons.

The structural formula is

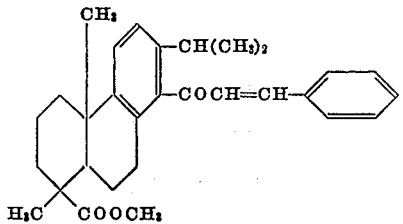

Example 10

An intimate mixture of 120 parts of dehydroabietinol and 30 parts of boric acid is heated for two hours at about 150–160° C. and then destructively distilled at 0.07 mm. pressure. The distillate is redistilled at about 0.025 mm., and a large fraction distilling at about 122–125° C. is collected.

A mixture of 20 parts of the distillate, 50 parts of glacial acetic acid, and 0.5 part of platinum oxide catalyst is shaken in the presence of a hydrogen atmosphere at about 400–500 pounds per square inch pressure for 2–3 hours, or until approximately one molecular equivalent of hydrogen has been consumed. The catalyst is removed by filtration through a bed of diatomaceous earth and the filtrate, combined with ethyl acetate washings, is mixed with several times its volume of water and distilled under reduced pressure until the ethyl acetate and most of the acetic acid are removed. The remaining aqueous mixture is extracted with ether, and the ethereal solution is washed with water, with dilute sodium hydroxide solution, and with several portions of water. The dried ethereal solution is concentrated to a small volume, and the residue is distilled at about 0.02 mm. A distillate comprising 1-ethyl-4a-methyl-7-isopropyl-1,2,3,4,4a,9,10, 10a-octahydrophenanthrene is collected at about 110–115° C.

To a stirred solution of 81 parts of this product and 25 parts of acetyl chloride in 360 parts of nitrobenzene, maintained at about 0–5° C., is added 80 parts of aluminum chloride over a period of one hour. The cold mixture is stirred for an additional hour and then maintained at about 5° C. for 16 hours. It is then poured onto ice. Ether (700 parts) is added, and after thorough mixing, the organic solvent layer is separated, washed with water, with dilute sodium hydroxide solution, and finally with several portions of water. The ethereal solution is dried, filtered and evaporated, and the residue is distilled at about 0.02 mm. A large fraction is collected at a distillation temperature of about 145° C. The distillate is crystallized from about 400 parts of methanol, and the solid product is collected and purified by repeated crystallizations from methanol. The 1-ethyl-4a-methyl-6-acetyl-7 - isopropyl - 1,2,3,4,4a,9,10,10a-octahydrophenanthrene thus obtained melts at about 138° C. after softening at about 130° C. The specific rotation of a 1.02% solution in chloroform is about +80.9°. The infrared absorption spectrum shows maxima at 5.97, 7.30, 7.37, and 7.92 microns. The structural formula is

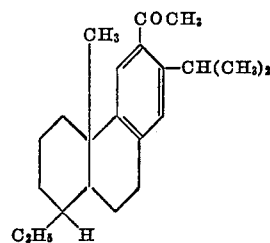

The methanolic crystallization liquor remaining after the first crystallization of this compound is distilled at about 0.03 mm., and a fraction is collected at a distillation temperature of about 150–155° C. This product is 1-ethyl-4a-methyl-7-isopropyl-8-acetyl-1,2,3,4,4a,9,10,10a-octahydrophenanthrene which exhibits a specific rotation of about +27.6° in a 1.05% chloroform solution. The structural formula is

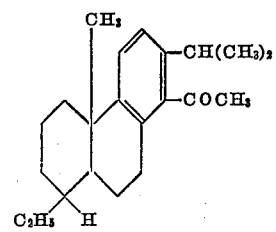

Example 11

A reaction mixture containing 4 parts of 1-ethyl-4a-methyl-6-acetyl-7-isopropyl-1,2,3,4a,9,10,10a - octahydrophenanthrene, 3 parts of benzaldehyde and 1.2 parts of sodium methoxide in 40 parts of methanol is heated under reflux for 20 minutes. The mixture is made slightly acidic with dilute hydrochloric acid. The methanol and unreacted benzaldehyde are removed by distillation with steam, and the water-insoluble, gummy product which remains is dissolved in ether. The ethereal solution is washed with water, with 2% sodium hydroxide solution, and finally with several portions of water, after which it is made anhydrous, filtered, and brought to dryness by vaporization. The product obtained by vaporization of the ether is crude 1-ethyl-4a-methyl-6-cinnamoyl-7-ispropyl-1,2,3,4,4a,9,10,10a-octahydrophenanthrene which shows an absorption maximum in the ultraviolet at about 297 millimicrons. Prominent infrared absorption maxima appear at about 6.02, 6.14, 6.26, 7.24, and 7.81 microns.
The structural formula is

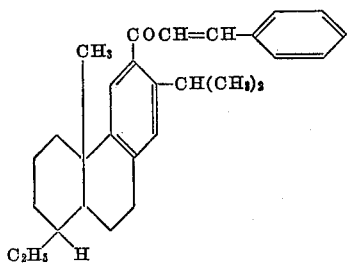

By the same procedure, with the substitution of 4 parts of 1-ethyl-4a-methyl-7-isopropyl-8-acetyl-1,2,3,4,4a,9,10,10a-octahydrophenanthrene for the 1-ethyl-4a-methyl-6-acetyl - 7 - isopropyl - 1,2,3,4,4a,9,10,10a-octahydrophenanthrene, the product obtained is 1-ethyl-4a-methyl-7-isopropyl - 8 - cinnamoyl-1,2,3,4,4a,9,10,10a-octahydrophenanthrene.

What is claimed is:
1. A compound of the structural formula

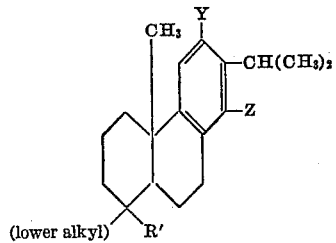

wherein one of the radicals Y and Z is hydrogen and the other is a

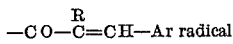

R represents a member of the class consisting of hydrogen and lower alkyl radicals; R' represents a member of the class consisting of hydrogen, the methyl radical, the carboxyl radical and (lower)alkoxycarbonyl radicals; and Ar represents a member of the class consisting of the phenyl radical and (lower)alkoxyphenyl radicals.

2. 1,1,4a-trimethyl-6-cinnamoyl - 7 - isopropyl-1,2,3,4,4a,9,10,10a-octahydrophenanthrene.

3. A compound of the structural formula

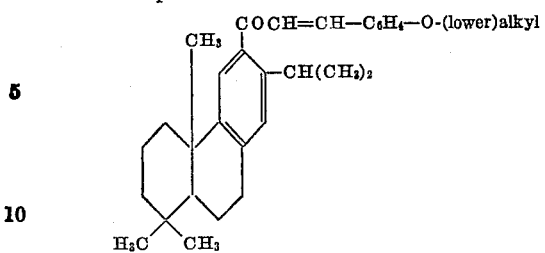

wherein $C_6H_4$—O-(lower)alkyl represents a (lower)alkoxyphenyl radical.

4. 1,1,4a - trimethyl - 6 - (p-methoxycinnamoyl)-7-isopropyl-1,2,3,4,4a,9,10,10a-octahydrophenanthrene.

5. 1,4a-dimethyl - 1 - (lower)alkoxycarbonyl-6-cinnamoyl - 7 - isopropyl-1,2,3,4,4a,9,10,10a-octahydrophenanthrene.

6. 1,4a-dimethyl-1-methoxycarbonyl-6-cinnamoyl-7-isopropyl-1,2,3,4,4a,9,10,10a-octahydrophenanthrene.

7. A compound of the structural formula

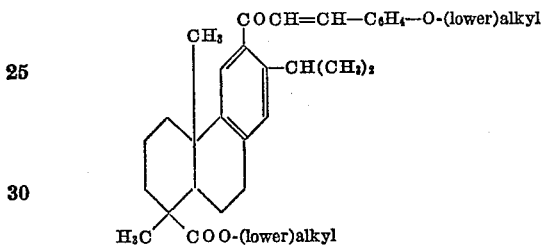

wherein $C_6H_4$—O-(lower)alkyl represents a (lower)alkoxyphenyl radical.

8. 1,4a-dimethyl - 1 - methoxycarbonyl-6-(p-methoxycinnamoyl) - 7 - isopropyl-1,2,3,4,4a,9,10,10a-octahydrophenanthrene.

References Cited in the file of this patent
UNITED STATES PATENTS

| | | |
|---|---|---|
| 2,750,373 | Bible | June 12, 1956 |
| 2,767,162 | Picha | Oct. 16, 1956 |
| 2,805,255 | Hoehn | Sept. 3, 1957 |